(12) United States Patent
Almansa-Valverde et al.

(10) Patent No.: US 11,737,159 B2
(45) Date of Patent: Aug. 22, 2023

(54) NETWORK NODE AND METHOD FOR IDENTIFYING USER EQUIPMENT NON-COMPLIANT WITH MODIFIED CRS OPERATION IN WIRELESS COMMUNICATION NETWORK

(71) Applicant: Telefonaktiebolaget LM Ericsson (publ), Stockholm (SE)

(72) Inventors: Sergio Almansa-Valverde, Lund (SE); Fredrik Saarnak, Löddeköpinge (SE); Waqas Nawaz Khan, Lund (SE); Dino Pjanic, Malmö (SE); Gabriel Cercel, Helsingborg (SE); André Nyberg, Staffanstorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 308 days.

(21) Appl. No.: 17/287,151

(22) PCT Filed: Oct. 24, 2018

(86) PCT No.: PCT/EP2018/079161
§ 371 (c)(1),
(2) Date: Apr. 21, 2021

(87) PCT Pub. No.: WO2020/083481
PCT Pub. Date: Apr. 30, 2020

(65) Prior Publication Data
US 2021/0392715 A1    Dec. 16, 2021

(51) Int. Cl.
*H04W 76/19* (2018.01)
*H04L 5/00* (2006.01)
*H04W 8/28* (2009.01)

(52) U.S. Cl.
CPC .......... *H04W 76/19* (2018.02); *H04L 5/005* (2013.01); *H04W 8/28* (2013.01)

(58) Field of Classification Search
CPC ........ H04W 76/19; H04W 5/005; H04W 8/28
See application file for complete search history.

(56) References Cited

U.S. PATENT DOCUMENTS

| | | | | |
|---|---|---|---|---|
| 2016/0183261 A1* | 6/2016 | Koorapaty | ............ | H04L 5/0048 370/239 |
| 2019/0261344 A1* | 8/2019 | Grant | .................. | H04B 7/0617 |

OTHER PUBLICATIONS

Huawei et al., "On the signalling support for network-based CRS IM", 3GPP TSG-RAN WG4 Meeting #87, Busan, Korea, May 21-25, 2018, R4-1807378 (Year: 2018).*

(Continued)

*Primary Examiner* — Joseph A Bednash
(74) *Attorney, Agent, or Firm* — Coats & Bennett, PLLC

(57) ABSTRACT

A method performed in a network node for identifying UEs which are non-compliant with modified CRS operation. The network node enables CRS operation according to a first configuration for a first period. The network node analyzes Information Elements (IE) in RRC Connection Re-establishment Request messages received from UEs during the first period. The network node generates a first set containing identities of UEs whose values in reestablishmentCause IE in the RRC Connection Re-establishment Request messages received during the first period are "otherFailure". When the first period is finished, the network node enables CRS operation according a second configuration different from the first configuration for a second period. The network node analyzes IE in RRC Reestablishment Request messages received from UEs during the second period. The network node generates a set containing identities of non-compliant UEs based on the first set and analyzing IE in the RRC Reestablishment Request messages received during the second period.

26 Claims, 5 Drawing Sheets

(56) References Cited

OTHER PUBLICATIONS

Nokia et al., 3GPP TSG-RAN WG4 Meeting #86, Athens, Greece, Feb. 26-Mar. 2, 2018, R4-1802793 (Year: 2018).*

3GPP TS 36.331 V15.3.0 (Sep. 2018); 3rd Generation Partnership Project; Technical Specification Group Radio Access Network; Evolved Universal Terrestrial Radio Access (E-UTRA); Radio Resource Control (RRC); Protocol Specification (Release 15); pp. 122-123 (Year: 2018).*

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 15)", Technical Specification, 3GPP TS 36.331 V15.3.0, Sep. 1, 2018, pp. 1-918, 3GPP.

Ericsson et al., "Keeping Track of Updated Peers", 3GPP TSG SA WG3 Security—S3#59, Lisbon, Portugal, Apr. 26, 2010, pp. 1-8, S3-100498, 3GPP.

Ericsson et al., "Capability Signaling and Notification of Updates for CRS Muting", 3GPP TSG-RAN WG2 #102, Busan, Korea, May 21, 2018, pp. 1-3, R2-1807811, 3GPP.

Huawei et al., "Corrections of CRS Muting Fields", 3GPP TSG-RAN2 Meeting #103bis, Chengdu, China, Oct. 8, 2018, pp. 1-9, R2-1814906, 3GPP.

Mediatek Inc., "Legacy Impacts on Demodulation", 3GPP TSG-RAN WG4 Meeting #84, Berlin, Germany, Aug. 21, 2017, pp. 1-5, R4-1707868, 3GPP.

Hoymann, C. et al., "A Lean Carrier for LTE", IEEE Communications Magazine, Feb. 1, 2013, pp. 74-80, IEEE.

Huawei et al., "Corrections for CRS Muting Fields", 3GPP TSG-RAN2 Meeting #103bis, Chengdu, China, Oct. 8, 2018, pp. 1-5, R2-1814905, 3GPP.

* cited by examiner

NETWORK NODE AND METHOD FOR IDENTIFYING USER EQUIPMENT NON-COMPLIANT WITH MODIFIED CRS OPERATION IN WIRELESS COMMUNICATION NETWORK

TECHNICAL FIELD

Embodiments herein relate to a network node and method therein. In particular, they relate to how to identify User Equipment (UEs) which are non-compliant with modified cell-specific reference signal (CRS) operation in a wireless communication network.

BACKGROUND

Wireless communication networks, such as Global System for Mobile Communications (GSM) networks, Wideband Code Division Multiple Access (WCDMA) or High Speed Packet Access (HSPA) networks, Long Term Evolution (LTE) networks, usually cover a geographical area which is divided into cell areas. Each cell area is served by a base station, which may also be referred as a network node, a network access node or an access node etc. A wireless communication network may include a number of cells that can support communications for a number of wireless communication devices or UEs.

Cell-Specific Reference Signals (CRSs) are downlink physical signals used by UEs as a reference point for a cell's downlink power. It is used in LTE for downlink channel quality measurements. CRS's are transmitted in predefined resource elements across the entire system bandwidth at every downlink subframe regardless of the traffic in the cell. CRS transmission generates inter-cell interference in cells on the same frequency which impacts downlink throughput performance, as described in C. Hoymann, et. al., "*A Lean Carrier for LTE,*" in IEEE Communications Magazine, vol. 51, no. 2, pp. 74-80, February 2013.

One existing solution to reduce CRS-induced inter-cell interference is known commercially as Ericsson Lean Carrier, i.e. an LTE carrier with minimized control channel overhead and cell-specific reference signals. That means that CRSs are blanked out in control and data frequency regions when it is expected that they will not be measured by any UE.

However, modifications in CRS transmission pattern not considered by 3rd Generation Partnership Project (3GPP) may result in incompatibilities with UEs if these have conflicting implementations.

More precisely, it has been observed that some UE vendors' implementation of CRS acquisition and usage are not compatible with CRS blanking. One example of incompatibility is if a UE tries to measure the CRS at a time when CRS is being transmitted only in the middle PRBs, but the specific UE implementation requires CRS over the whole system bandwidth. This may lead to accessibility and retainability problems.

One existing solution for this problem, is to identify non-compliant UEs by manually configured filters on model or vendor ID using UE's International Mobile Equipment Identity (IMEI). These filters are used to keep track on whether there are non-compliant UEs connected to a cell. CRS blanking will be disabled in the cell if a non-compliant UE is connected. The main problems of this implementation are, firstly, that criteria to set up the filters are dependent on interoperability test and therefore, very difficult to update, and not all UE models or vendors can be tested. Secondly, there is no mechanism to automatically update the filters to identify non-compliant UEs.

This problem may apply not only to CRS blanking, but potentially to other optimizations modifying the CRS operation as described in 3GPP, leading to compatibility issues with UEs.

SUMMARY

It is therefore an object of embodiments herein to provide an improved method and apparatus for identifying UEs non-compliant with modified CRS operation in a wireless communication network.

It has been observed that non-compliant UEs connected to a cell blanking out CRS will send RRC Connection Reestablishment Request with reestablishmentCause IE set to "otherFailure". This is used by the proposed method according to embodiments herein.

According to one aspect of embodiments herein, the object is achieved by a method performed in a network node for identifying UEs which are non-compliant with modified CRS operation. The network node enables CRS operation according to a first configuration for a first period. The network node analyzes Information Elements (IE) in RRC Connection Re-establishment Request messages received from UEs during the first period. The network node generates a first set containing identities of UEs whose values in reestablishmentCause IE in the RRC Connection Re-establishment Request messages received during the first period are "otherFailure". When the first period is finished, the network node enables CRS operation according a second configuration different from the first configuration for a second period. The network node analyzes IE in RRC Reestablishment Request messages received from UEs during the second period. The network node generates a set containing identities of non-compliant UEs based on the first set and analyzing IE in the RRC Reestablishment Request messages received during the second period.

According to one aspect of embodiments herein, the object is achieved by a network node for identifying UEs which are non-compliant with modified CRS operation. The network node is configured to enable CRS operation according to a first configuration for a first period. The network node is further configured to analyze Information Elements (IE) in RRC Connection Re-establishment Request messages received from UEs during the first period. The network node is configured to generate a first set containing identities of UEs whose values in reestablishmentCause IE in the RRC Connection Re-establishment Request messages received during the first period are "otherFailure". When the first period is finished, the network node is configured to enable CRS operation according a second configuration different from the first configuration for a second period. The network node is configured to analyze IE in RRC Reestablishment Request messages received from UEs during the second period. The network node is configured to generate a set containing identities of non-compliant UEs based on the first set and analyzing IE in the RRC Reestablishment Request messages received during the second period.

According to the embodiments herein, the first configuration and the second configuration are different in any one of or a combination of frequency and time. For example, one of the first or second configurations may be a modified configuration, e.g. where CRS is blanking out during some subframes, as compared to a standardized configuration according to LTE standard.

The proposed method is an automatic two-step sequence:

In the first phase, CRS is operated either with a modified configuration or a standard configuration. The network node then analyzes values in reestablishmentCause IE when RRC Connection Re-establishment Request messages are received from UEs, and put UEs whose values are "otherFailure" into a first set.

In the second phase, CRS is operated with a different configuration as compared to the first phase. RRC Connection Reestablishment Requests will be monitored and values in reestablishmentCause IE are analyzed when RRC Connection Re-establishment Request messages are received from UEs during the second phase. UEs non-compliant with the modified CRS operation, are identified by comparing two analysis results during two phases and a set of non-compliant UEs is generated.

This sequence may be run periodically to automatically keep the set of non-compliant UEs updated. Further the network node may analyze or filter the set of non-compliant UEs, by e.g. analyzing International Mobile Equipment Identity, IMEI, of the UEs included in the set of non-compliant UEs, to generate a set of non-compliant device models or vendors. Then a set of non-compliant UE models or vendors may also be updated automatically.

As discussed in the background, the criteria to identify non-compliant UEs in the existing method are based on knowledge from interoperability test. This is not sufficient as not all UE models or vendors can be tested, and it is very difficult to update. With the proposed solution the decision is based on live behavior when CRS optimization procedure is enabled.

Therefore, the embodiments herein provide an improved method and apparatus for identifying UEs non-compliant with modified CRS operation in a wireless communication network.

BRIEF DESCRIPTION OF THE DRAWINGS

Examples of embodiments herein are described in more detail with reference to attached drawings in which.

DETAILED DESCRIPTION

Figure 1:
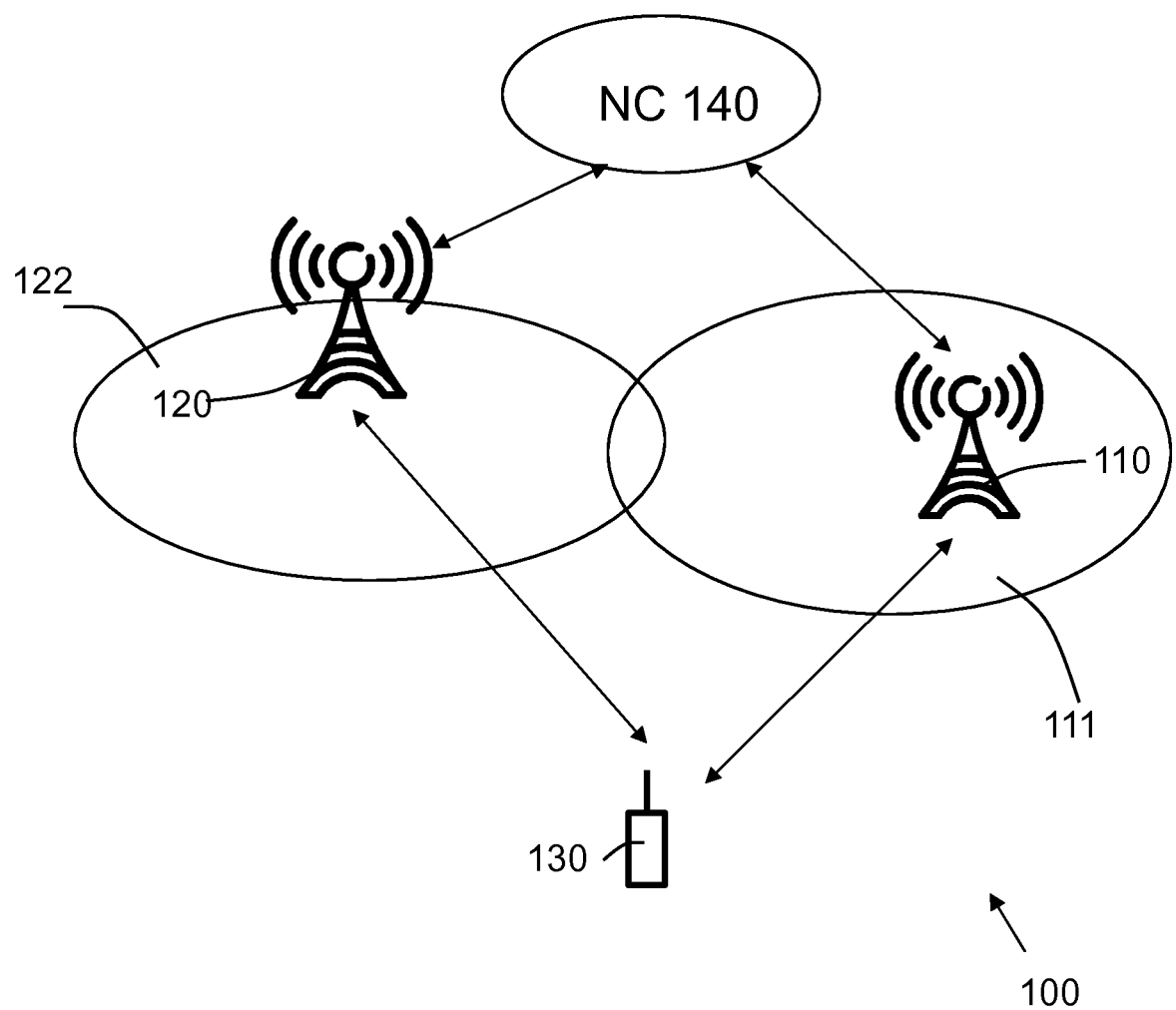
FIG. 1 is a schematic block diagram illustrating a wireless communication network.

FIG. 1 depicts an example of a wireless communication network 100 in which embodiments herein may be implemented. The wireless communication network 100 may be any wireless system or cellular network, such as a Long Term Evolution (LTE) network, any 3$^{rd}$ Generation Partnership Project (3GPP) cellular network, a Fourth Generation (4G) or LTE advanced network etc.

The wireless communication network 100 comprises a plurality of network nodes whereof two, a first network node 110 which serves a first cell 111 and a second network node 120 serves a secondary cell 122, are depicted in FIG. 1. The first network node 110 and the second network node 120 are network access nodes which may also be referred as base station, eNB, gNB, eNodeB, gNodeB etc.

A plurality of wireless communication devices operates in the wireless communication network 100, whereof a wireless communication device 130 is depicted. The wireless communication device 130 may be an UE, a mobile wireless terminal or a wireless terminal, a mobile phone, or any other radio network units capable to communicate with the network node 110, 120 over a radio link in the wireless communication network 100. In the following, the terms "UE" and "wireless communication device" are used interchangeably, so as the terms "base station" and "network access node".

The wireless communication network 100 may further comprise other network nodes, such as a network controller or a core network 140, which communicates with the first and second network nodes 110, 120, and acts as a handling unit or a controller for different Radio Access Technologies. The network controller 140 may be a separate node as depicted in the figure, or its corresponding functionalities may be incorporated within another network node such as e.g. the network nodes 110, 120.

Figure 2:
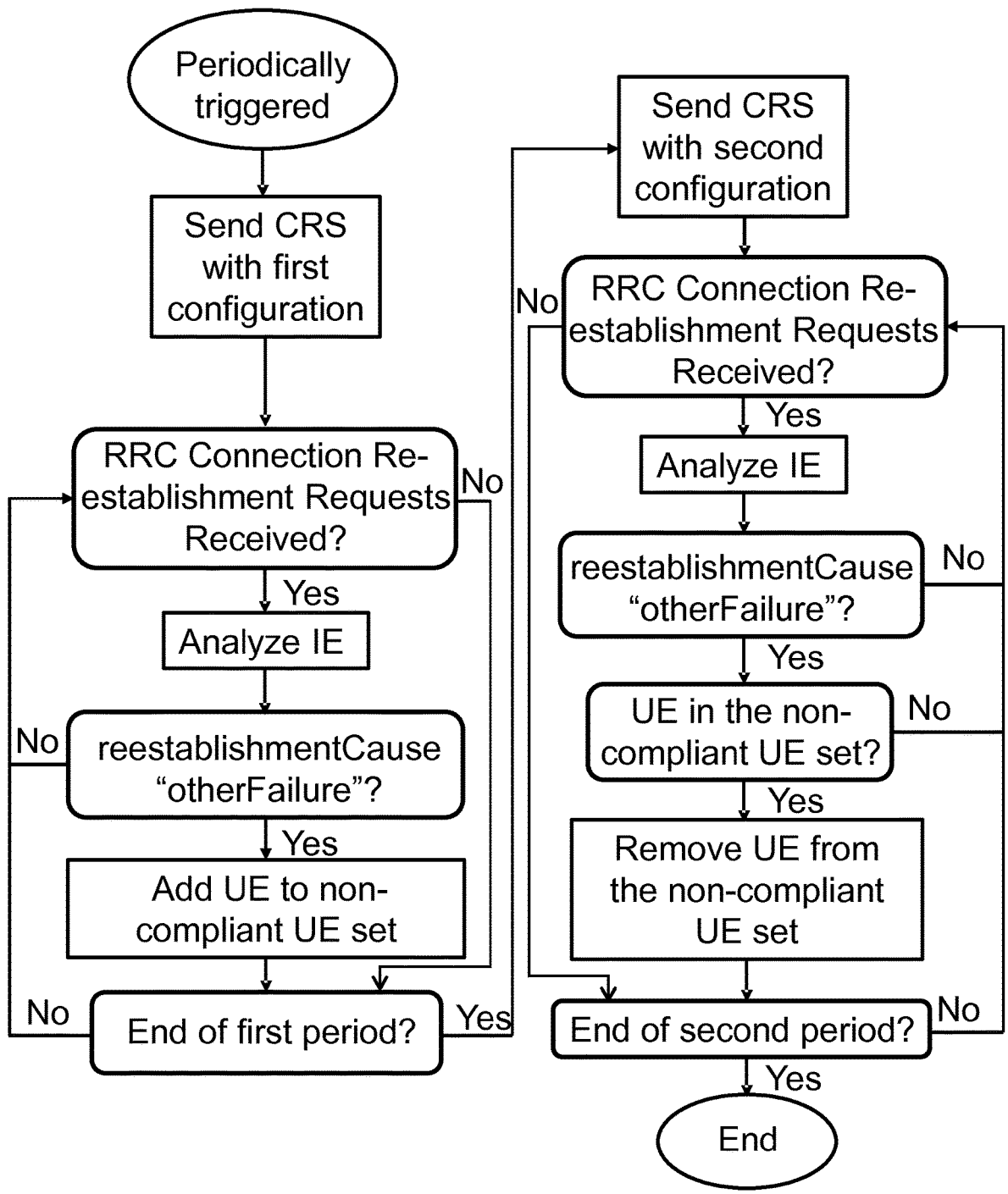
FIG. 2 is a flow chart illustrating a procedure of generating and updating a set of UEs non-compliant with modified CRS operation according to one embodiment herein.

FIG. 2 shows a procedure of automatically generating and updating a set of UEs non-compliant with modified CRS operation according to a first embodiment herein.

In this embodiment, in the first phase, the CRS optimization is enabled in a selected cell, i.e. sending CRS according to a first configuration, where the first configuration is a modified configuration as compared to LTE standard. At this state, the base station monitors if there is RRC Reestablishment Requests received. RRC Reestablishment Requests received at the base station will be analysed for non-compliant UE detection. If reestablishmentCause IE is set to "otherFailure", the UE sending the request will be presumptively added to a preliminary set of non-compliant UEs candidates. That means the preliminary set in the first phase contains potential non-compliant UEs.

After a configured time, the first phase ends, the second phase starts. CRS optimization is disabled, i.e. sending CRS with a second configuration. The second configuration is a standard, e.g. LTE configuration. RRC Reestablishment Requests received at the base station are again analyzed using the same criteria as the first phase. UEs sending RRC Connection Reestablishment Request with reestablishmentCause set to "otherFailure" are most likely not sending it due to non-compliant with CRS optimization. Hence, the base station checks if the UE sending the request is in the preliminary set, if it is, the UE is removed from the preliminary set. After a configured time, the second phase is finished and the final set of non-compliant UEs is generated and updated by using the preliminary set as input.

Figure 3:
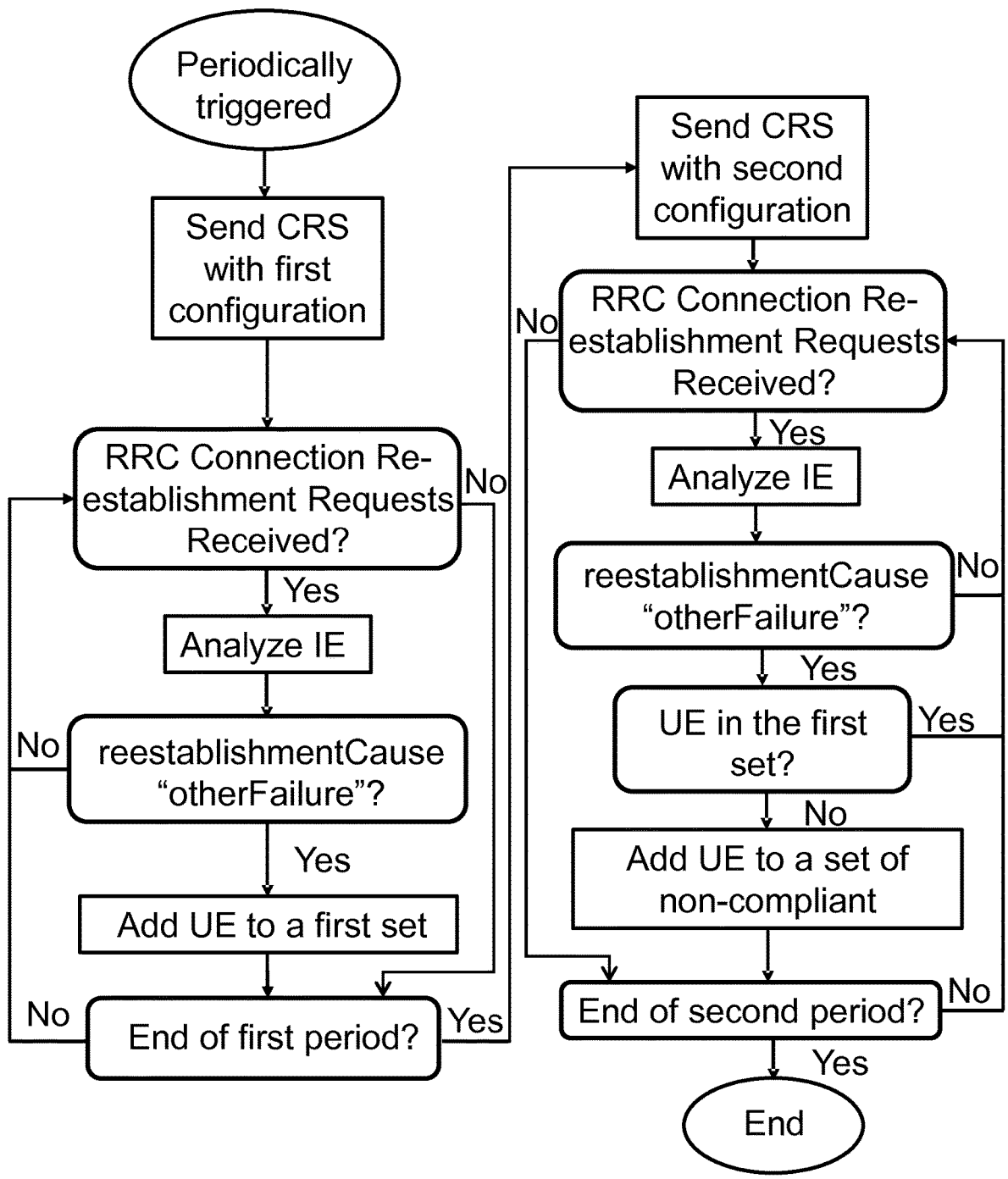
FIG. 3 is a flow chart illustrating a procedure of generating and updating a set of UEs non-compliant with modified CRS operation according to another embodiment herein.

FIG. 3 shows a procedure of automatically generating and updating a set of UEs non-compliant with modified CRS operation according to a second embodiment herein.

In this embodiment, in the first phase, the CRS optimization is disabled in a selected cell, i.e. sending CRS with a first configuration, where the first configuration is a standard, e.g. LTE, configuration. At this state, RRC Reestablishment Requests received at the base station will be analysed. If reestablishmentCause IE is set to "otherFailure", the UE sending the request will be added to a first set. The first set in the first phase then contains UEs sending RRC Reestablishment Requests due to other reasons than non-compliant with CRS optimization.

After a configured time, the first phase ends, the second phase starts. CRS optimization is enabled, i.e. sending CRS with a second configuration, a modified configuration as compared to the standard LTE configuration. RRC Reestablishment Requests received at the base station are again analyzed using the same criteria as the first phase. UEs sending RRC Connection Reestablishment Request with reestablishmentCause set to "otherFailure" are most likely due to non-compliant with CRS optimization or other reasons. Hence, the UE sending the request is checked and see if it is in the first set. If it is in the first set, then it sent RRC Reestablishment Requests with reestablishmentCause set to "otherFailure" is due to other reasons than non-compliant with the CRS optimization. If it is not in the first set, then it sent RRC Reestablishment Requests with reestablishmentCause set to "otherFailure" is due to non-compliant with the CRS optimization, and it is added to a set of non-compliant UEs. After a configured time, the second phase is finished and a final set of non-compliant UEs is generated and updated.

According to some embodiments herein, in the second phase, a second set may be generated after analyzing received RRC Connection Reestablishment Requests. The second set contains UEs whose values in reestablishmentCause IE are "otherFailure". Then the set of non-compliant UEs is generated by removing from the second set the UEs whose values in reestablishmentCause IE are "otherFailure" during the first phase.

The sequence described above with reference to FIGS. 2 and 3 may be periodically triggered after a configurable time.

There are two timers involved in the proposed solution. The first timer is used to trigger the whole sequence and defines how often the non-compliant UE set update process is triggered. The second timer is used to end each of the phases, defining how long RRC Connection Reestablishment Requests will be monitored and processed to fill in the preliminary set. The two phases may have different lengths, so the second timer may be configured to have a first and second periods to end each of the phases differently. The total length of this timer must be greater than the LTE timer T310. Timer T310 is started when physical layer problems are detected i.e. upon receiving N310 consecutive out-of-sync indications from lower layers, and RRC Connection Reestablishment Request is triggered at timeout of the timer T310.

Figure 4:
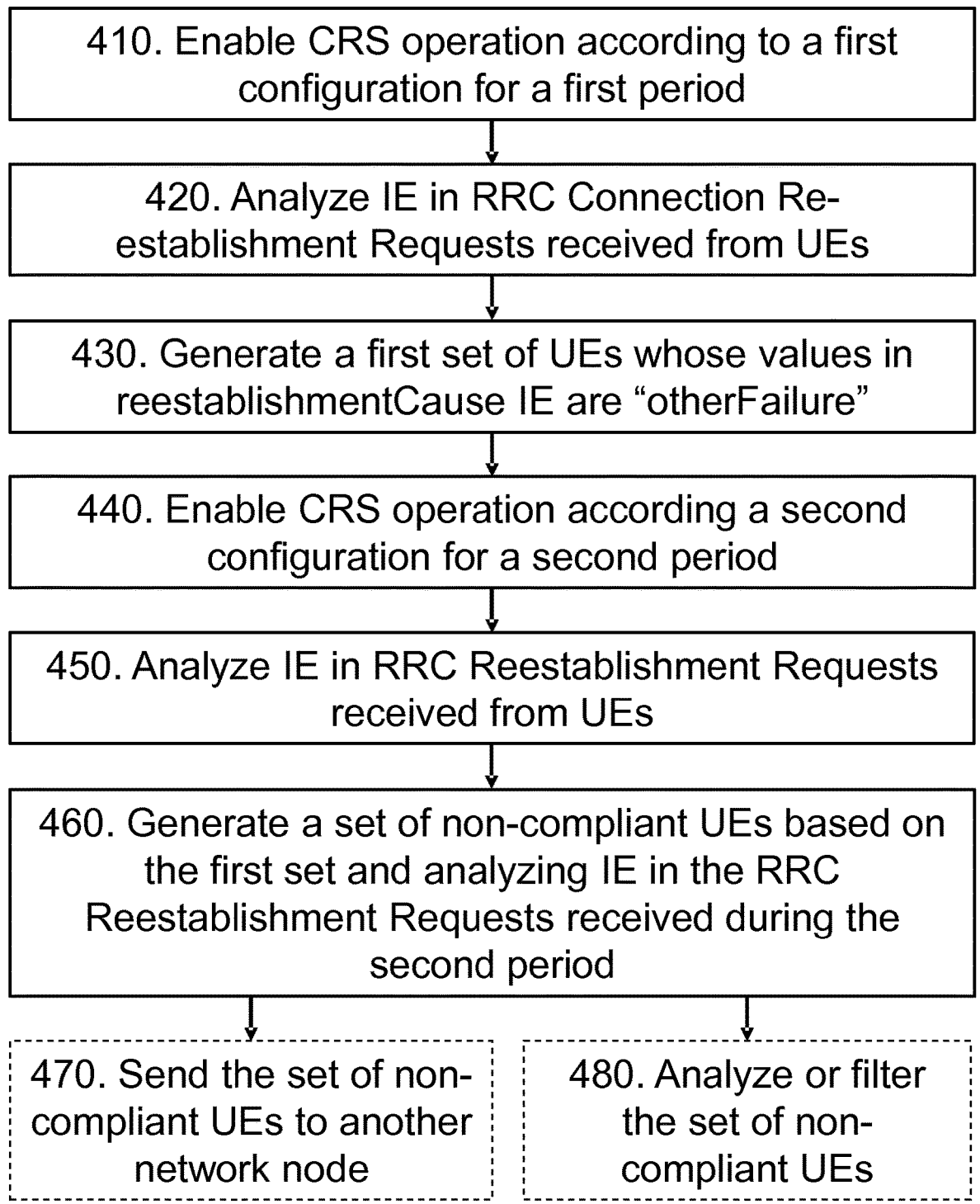
FIG. 4 is a flowchart illustrating a method performed in a network node according to embodiments herein.

Example of embodiments of a method performed in a network node 110, 120 for identifying UE which are non-compliant with modified CRS operation in a wireless communication network 100 will now be described with reference to FIG. 4. The network node 110, 120 may be any one of a network access node, a base station, eNB, gNB, eNodeB, gNodeB, an access node or other type of network node. The method comprises the following actions.

Action 410

The network node 110 enables CRS operation according to a first configuration for a first period.

Action 420

The network node 110 analyzes IE in the RRC Connection Re-establishment Request messages received from UEs during the first period.

Action 430

The network node 110 generates a first set containing identities of UEs whose values in reestablishmentCause IE in the RRC Connection Re-establishment Request messages received during the first period are "otherFailure".

Action 440

When the first period is finished, the network node 120 enables CRS operation according a second configuration different from the first configuration for a second period.

Action 450

The network node 110 analyzes IE in the RRC Connection Reestablishment Request messages received from UEs during the second period.

Action 460

The network node 110 generates a set containing identities of non-compliant UEs based on the first set and analysis results of the IE in the RRC Reestablishment Request messages received during the second period.

According to some embodiments herein, to generate a set of non-compliant device models or vendors, the method may further comprise the following actions:

Action 470

The network node 110 may send the set of non-compliant UEs to another network node, e.g. network controller 140, for further analysis or filtering.

Action 480

Alternatively, the network node 110 may analyze or filter the set of non-compliant UEs.

The analysis may comprise analyzing International Mobile Equipment Identity, IMEI, of the UEs included in the set of non-compliant UEs, to generate a set of non-compliant device models or vendors.

According to some embodiments herein, the first configuration and the second configuration are different in any one of or a combination of frequency and time.

According to some embodiments herein, the first configuration may be a modified configuration compared to a standardized configuration according to LTE standard and the second configuration is the standardized configuration according to LTE standard.

Then, the network node 110 generates a set containing non-compliant UEs may be performed by removing from the first set the UEs whose values in reestablishmentCause IE in the RRC Connection Re-establishment Request messages received during the second period are "otherFailure".

According to some embodiments herein, the first configuration may be a standardized configuration according to LTE standard, and the second configuration may be a modified configuration compared to the standardized configuration according to LTE standard.

Then, the network node 110 generates a set containing non-compliant UEs may be performed by generating a second set containing UEs whose values in reestablishmentCause IE are "otherFailure" during the second period, and removing from the second set the UEs whose values in reestablishmentCause IE are "otherFailure" during the first period to generate the set containing non-compliant UEs.

Alternatively, the network node 110 may generate a set containing non-compliant UEs by checking if UEs whose values in reestablishmentCause IE are "otherFailure" during the second period, are in the first set; and adding UEs to the set of non-compliant UEs if they are not in the first set.

According to some embodiments herein, the modified configuration may be modifying CRS operation in one or a combination of frequency and time as compared to LTE standard.

Modifying CRS operation in frequency may be a change in either what specific resource elements or a number of resource elements carrying the CRS as compared to LTE standard.

Modifying CRS operation in time may be blanking out CRS at specific subframes as compared to LTE.

Figure 5:
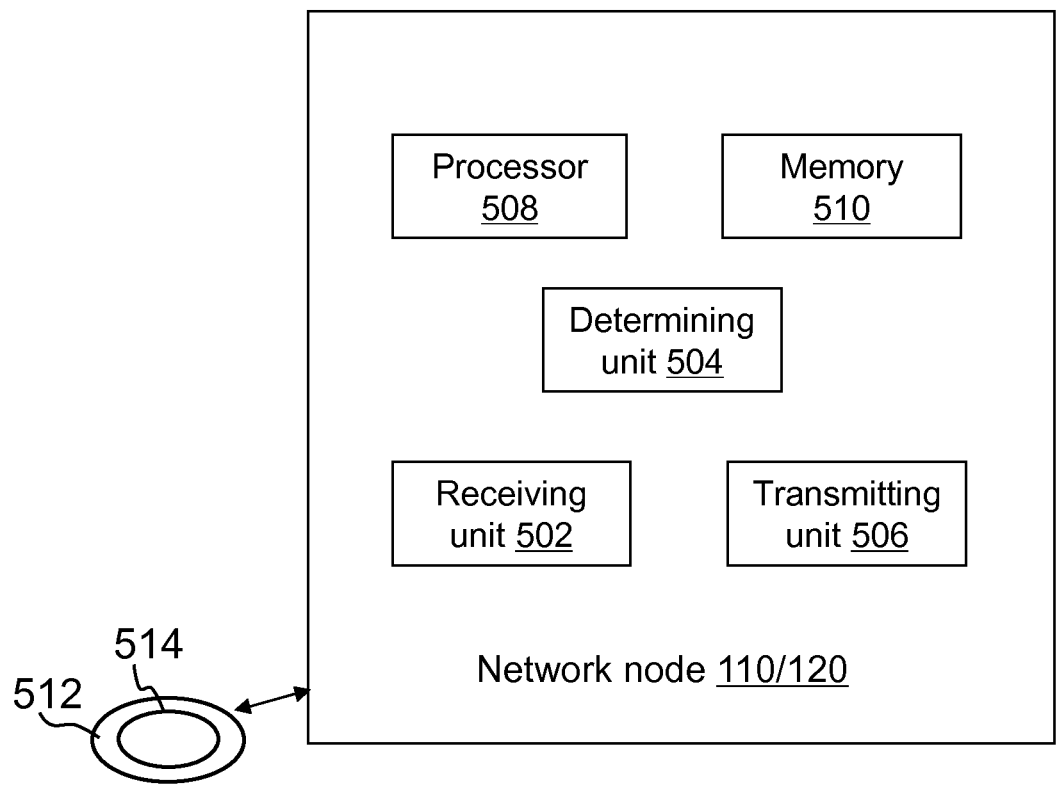
FIG. 5 is a schematic block diagram illustrating embodiments of a network node.

To perform the method actions in the network node 110, 120 for identifying UEs which are non-compliant with modified CRS operation in a wireless communication network 100, the network node 110, 120 comprises circuits or units as depicted in FIG. 5. The network node 110, 120 comprises e.g. a receiving unit 502, a determining unit 504, a transmitting unit 506, a processor 508 and a memory 510.

According to the embodiments herein, the network node 110 is configured to, e.g. by means of the determining unit 504 being configured to, enable CRS operation according to a first configuration for a first period.

When CRS operation is enabled, the network node 110 is configured to, e.g. by means of the transmitting unit 506 being configured to, send CRS with the first configuration for the first period.

The network node 110 is configured to, e.g. by means of the receiving unit 502 being configured to, receive RRC Connection Re-establishment Request messages.

The network node 110 is configured to, e.g. by means of the processor 508 being configured to, analyze Information Elements, IE, in the RRC Connection Re-establishment Request messages received from UEs during the first period.

The network node 110 is configured to, e.g. by means of the processor 508 being configured to, generate a first set containing identities of UEs whose values in reestablishmentCause IE in the RRC Connection Re-establishment Request messages received during the first period are "otherFailure".

When the first period is finished, the network node 110 is configured to enable CRS operation according a second configuration different from the first configuration for a second period.

When the CRS operation is enabled, the network node 110 is configured to, e.g. by means of the transmitting unit 506 being configured to, send CRS with the second configuration for the second period.

The network node 110 is configured to, e.g. by means of the receiving unit 502 being configured to, receive RRC Connection Re-establishment Request messages.

The network node 110 is configured to e.g. by means of the processor 508 being configured to, analyze IE in the RRC Connection Reestablishment Request messages received from UEs during the second period.

The network node 110 is configured to, by means of the processor 508 being configured to, generate a set containing identities of non-compliant UEs based on the first set and analyzing IE in the RRC Connection Reestablishment Request messages received during the second period.

To summarize, the procedure according to the embodiments herein for identifying UEs which are non-compliant with modified CRS operation or CRS optimization, is carried out periodically and a set of non-compliant UEs is generated and updated automatically. With the proposed solution, identifying or detecting of non-compliant UEs is based on live behavior when CRS optimization procedure is enabled. The generating, updating and handling of the set of non-compliant UEs may, depending on its specific implementation, be deployed as a cloud solution.

Those skilled in the art will appreciate that the receiving unit 502, the determining unit 504 and the transmitting unit 506 described above in the network node 110, 120 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for identifying UEs which are non-compliant with modified CRS operation in the wireless communication network 100 may be implemented through one or more processors, such as the processor 508 in the network node 110, 120 together with computer program code for performing the functions and actions of the embodiments herein. The program code mentioned above may also be provided as a computer program product, for instance in the form of a data carrier 512 carrying computer program code 514, as shown in FIG. 5, for performing the embodiments herein when being loaded into the network node 110, 120. One such carrier may be in the form of a CD ROM disc. It is however feasible with other data carriers such as a memory stick. The computer program code may furthermore be provided as pure program code on a server or a cloud and downloaded to the network node 110, 120.

The memory 510 in the network node 110, 120 may comprise one or more memory units and may be arranged to be used to store received information, measurements, the set of Non-compliant UEs, data, configurations and applications to perform the method herein when being executed in the network node 110, 120.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method, performed in a network node, for identifying User Equipment (UEs) which are non-compliant with modified cell-specific reference signal (CRS) operation, the method comprising the network node:
 enabling CRS operation according to a first configuration for a first period;
 analyzing Information Elements (IE) in Radio Resource Control (RRC) Connection Re-establishment Request messages received from UEs during the first period;
 generating a first set containing identities of UEs whose values in reestablishmentCause IE in the RRC Connection Re-establishment Request messages received during the first period are "otherFailure";
 when the first period is finished:
  enabling CRS operation according a second configuration different from the first configuration for a second period;
  analyzing IE in the RRC Connection Reestablishment Request messages received from UEs during the second period;
  generating a set containing identities of non-compliant UEs based on the first set and analyzing IE in the RRC Reestablishment Request messages received during the second period.

2. The method of claim 1, wherein the first configuration and the second configuration are different in frequency and/or time.

3. The method of claim 1, wherein the first configuration is a modified configuration compared to a standardized configuration according to Long Term Evolution (LTE)

standard and the second configuration is the standardized configuration according to the LTE standard.

4. The method of claim 3, wherein the generating the set containing non-compliant UEs is performed by removing, from the first set, the UEs whose values in reestablishment-Cause IE in the RRC Connection Re-establishment Request messages received during the second period are "otherFailure".

5. The method of claim 3, wherein the modified configuration is modifying CRS operation in frequency and/or time as compared to the LTE standard.

6. The method of claim 1, wherein the first configuration is a standardized configuration according to Long Term Evolution (LTE) standard, and the second configuration is a modified configuration compared to the standardized configuration according to the LTE standard.

7. The method of claim 6, wherein the generating the set containing non-compliant UEs comprises generating a second set containing UEs whose values in reestablishment-Cause IE are "otherFailure" during the second period, and removing from the second set the UEs whose values in reestablishmentCause IE are "otherFailure" during the first period to generate the set containing non-compliant UEs.

8. The method of claim 6, wherein the generating the set containing non-compliant UEs comprises:
checking if UEs whose values in reestablishmentCause IE are "otherFailure" during the second period are in the first list;
adding UEs to the set of non-compliant UEs if they are not in the first list.

9. The method of claim 8, wherein the modifying CRS operation in frequency comprises a change in either what specific resource elements or a number of resource elements carrying the CRS as compared to the LTE standard.

10. The method of claim 8, wherein modifying CRS operation in time comprises blanking out CRS at specific subframes as compared to the LTE standard.

11. The method of claim 1, further comprising sending the set of non-compliant UEs to another network node for further analysis or filtering.

12. The method of claim 1, further comprising analyzing or filtering the set of non-compliant UEs.

13. The method of claim 12, further comprising analyzing International Mobile Equipment Identity (IMEI) of the UEs included in the set of non-compliant UEs, for generating a set of non-compliant device models or vendors.

14. A network node for identifying User Equipment (UEs) which are non-compliant with modified cell-specific reference signal (CRS) operation, the network node comprising:
processing circuitry;
memory containing instructions executable by the processing circuitry whereby the network node is operative to:
enable CRS operation according to a first configuration for a first period;
analyze Information Elements (IE) in the Radio Resource Control (RRC) Connection Re-establishment Request messages received from UEs during the first period;
generate a first set containing identities of UEs whose values in reestablishmentCause IE in the RRC Connection Re-establishment Request messages received during the first period are "otherFailure";
when the first period is finished:
enable CRS operation according a second configuration different from the first configuration for a second period;
analyze IE in the RRC Connection Reestablishment Request messages received from UEs during the second period;
generate a set containing identities of non-compliant UEs based on the first set and analyzing IE in the RRC Reestablishment Request messages received during the second period.

15. The network node of claim 14, wherein the first configuration and the second configuration are different in frequency and/or time.

16. The network node of claim 14, wherein the first configuration is a modified configuration compared to a standardized configuration according to Long Term Evolution (LTE) standard, and the second configuration is the standardized configuration according to the LTE standard.

17. The network node of claim 16, wherein the instructions are such that the network node is operative to remove, from the first set, the UEs whose values in reestablishment-Cause IE in the RRC Connection Re-establishment Request messages received during the second period are "otherFailure", to generate the set containing non-compliant UEs.

18. The network node of claim 16, wherein the modified configuration is modifying CRS operation in frequency and/or time as compared to the LTE standard.

19. The network node of claim 18, wherein modifying CRS operation in frequency comprises a change in either what specific resource elements or a number of resource elements carrying the CRS as compared to LTE standard.

20. The network node of claim 18, wherein modifying CRS operation in time comprises blanking out CRS at specific subframes as compared to LTE.

21. The network node of claim 14, wherein the first configuration is a standardized configuration according to Long Term Evolution (LTE) standard, and the second configuration is a modified configuration compared to the standardized configuration according to the LTE standard.

22. The network node of claim 21, wherein the instructions are such that the network node is operative to:
generate a second set containing UEs whose values in reestablishmentCause IE are "otherFailure" during the second period; and
remove, from the second set, the UEs whose values in reestablishmentCause IE are "otherFailure" during the first period, to generate the set containing non-compliant UEs.

23. The network node of claim 21, wherein the instructions are such that the network node is operative to:
check if UEs whose values in reestablishmentCause IE are "otherFailure" during the second period, are in the first set; and
add UEs to the set of non-compliant UEs if they are not in the first set.

24. The network node of claim 14, wherein the instructions are such that the network node is operative to send the set of non-compliant UEs to another network node for further analysis or filtering.

25. The network node of claim 14, wherein the instructions are such that the network node is operative to analyze or filter the set of non-compliant UEs.

26. The network node of claim 25, wherein the instructions are such that the network node is operative to analyze International Mobile Equipment Identity (IMEI) of the UEs included in the set of non-compliant UEs, to generate a set of non-compliant device models or vendors.

* * * * *